United States Patent [19]

Takahata

[11] 4,283,158
[45] Aug. 11, 1981

[54] COUPLING DEVICE

[75] Inventor: Kenichi Takahata, Tokyo, Japan

[73] Assignee: Matsui Universal Joint Mfg. Co., Tokyo, Japan

[21] Appl. No.: 974,346

[22] Filed: Dec. 29, 1978

[30] Foreign Application Priority Data

Jun. 15, 1978 [JP] Japan ................. 53-71442

[51] Int. Cl.³ .............................................. F16B 7/00
[52] U.S. Cl. ..................... 403/322; 403/359
[58] Field of Search ............... 403/328, 316, 317, 315, 403/319, 322, 325, 359, 324

[56] References Cited

U.S. PATENT DOCUMENTS

| | | | |
|---|---|---|---|
| Re. 19,287 | 8/1934 | Pfauser | 403/328 |
| 3,357,206 | 12/1967 | Christie | 403/325 X |
| 3,747,966 | 7/1973 | Wilkes | 403/322 X |
| 3,822,951 | 7/1974 | Bornzin | 403/316 |
| 3,827,816 | 8/1974 | Knapp | 403/322 |

*Primary Examiner*—Andrew V. Kundrat
*Attorney, Agent, or Firm*—Owen, Wickersham & Erickson

[57] ABSTRACT

A coupling device for connecting a male member and a female member comprises a lock pin resiliently urged toward the male member by means of a spring to permit an insertion of the female member but extend into a lock groove of said male member to connect these members, an outer race rotatively resiliently urged in one direction relative to the female member and formed with a recess for receiving a part of the lock pin to permit it to remove from the lock groove of the male member, a slide pin for locking the outer race relative to the female member when the male member is not in the female member and releasing the outer race relative to the female member when the male member is inserted in the female member, and an outer race lock pin urged by an outer race lock pin spring to lock the outer race relative to the female member when the outer race is rotated. The coupling device is capable of connecting two members by a mere insertion of one member into the other member and disconnecting the two members by a slight rotation of the outer race on the other member.

10 Claims, 53 Drawing Figures

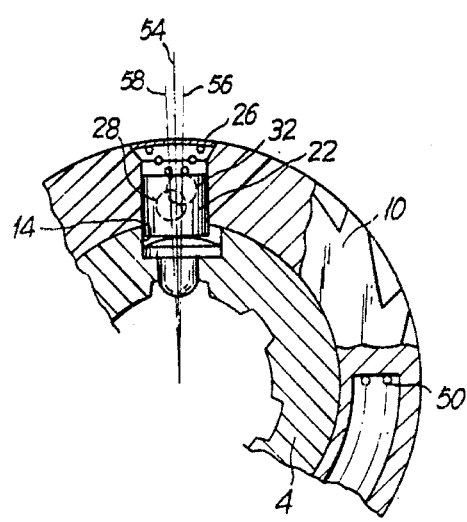
FIG._4a
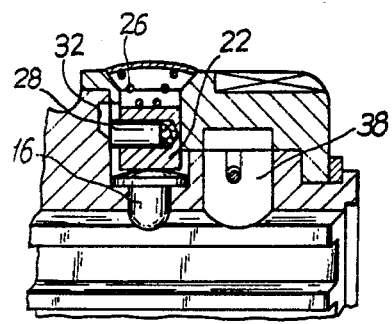
FIG._4b
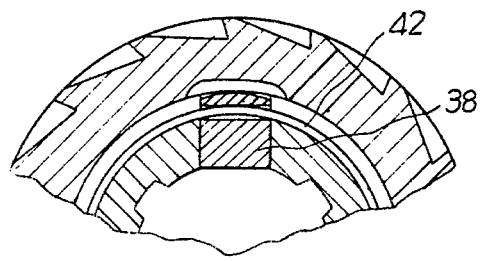
FIG._4c

FIG_5a
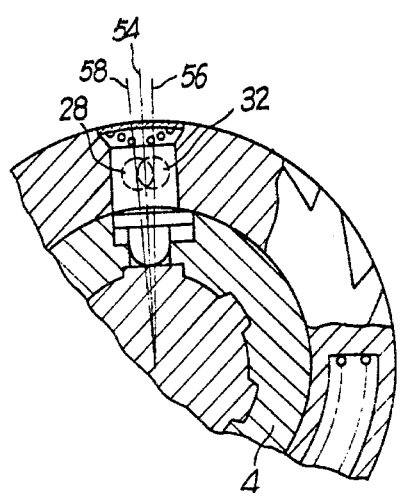
FIG_5b
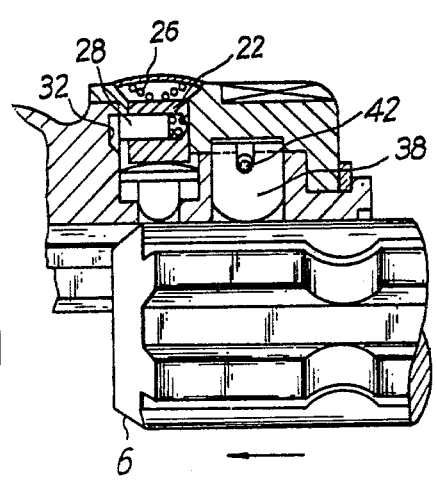
FIG_5c
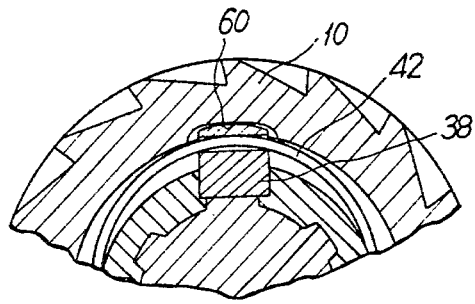

FIG_8a
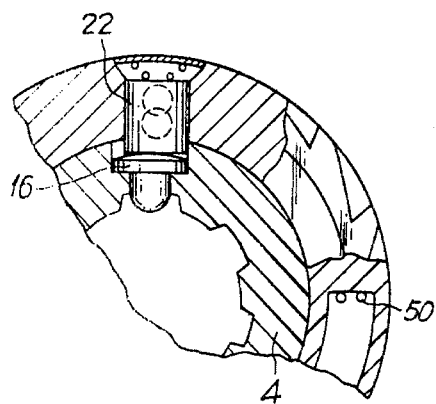
FIG_8b
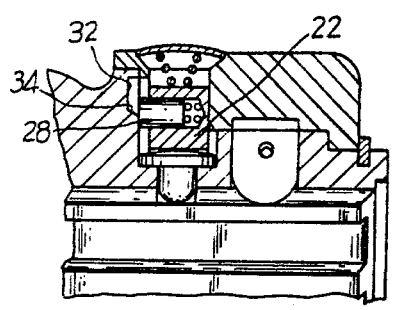
FIG_8c
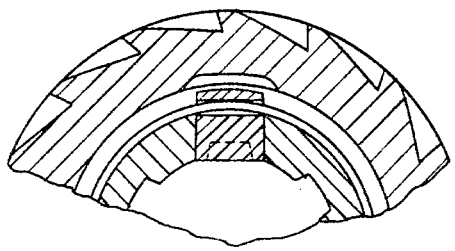

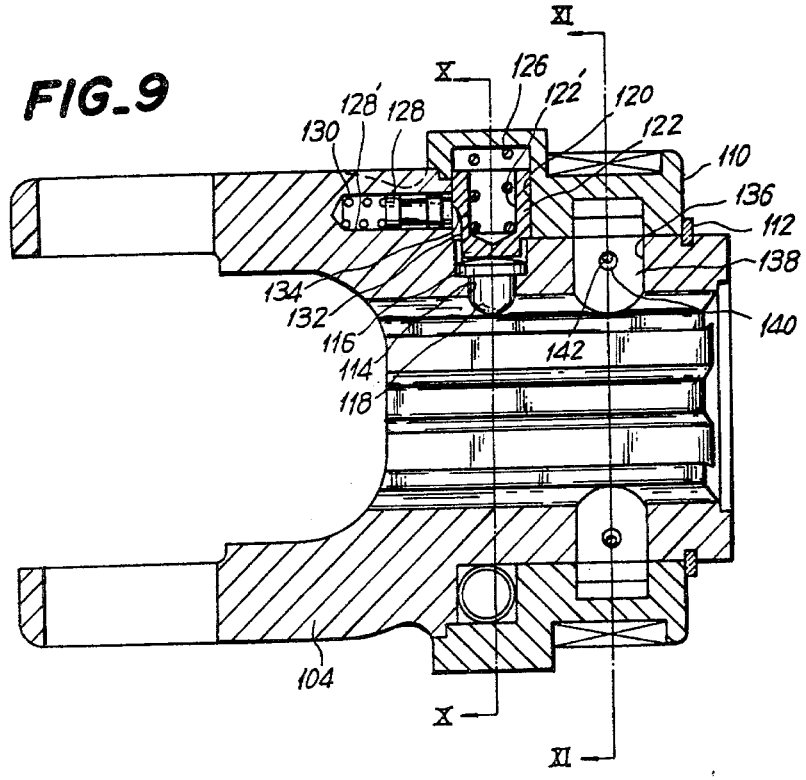
FIG_9
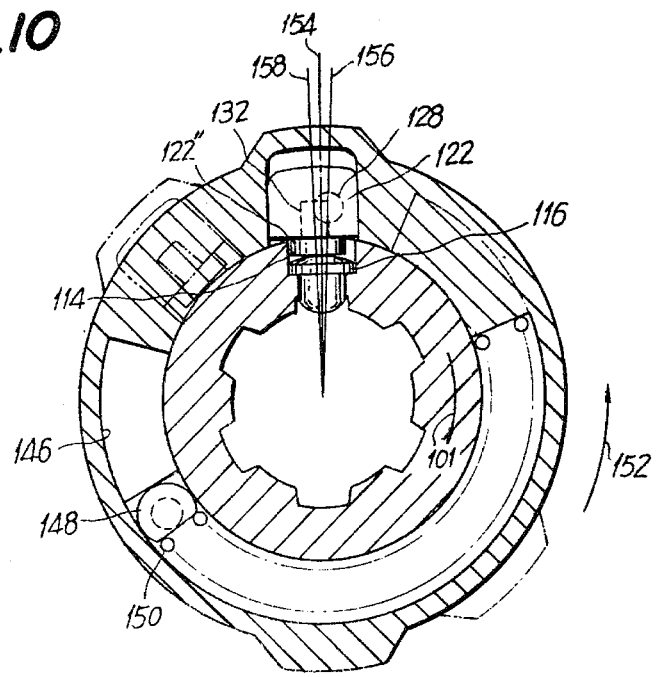
FIG_10

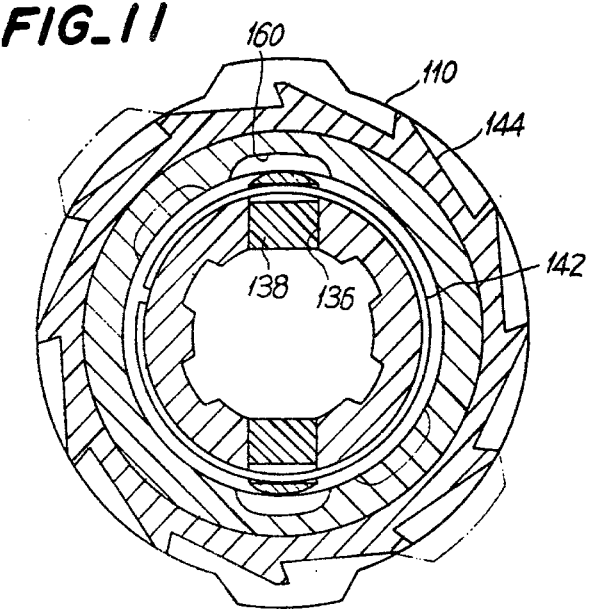
FIG_11
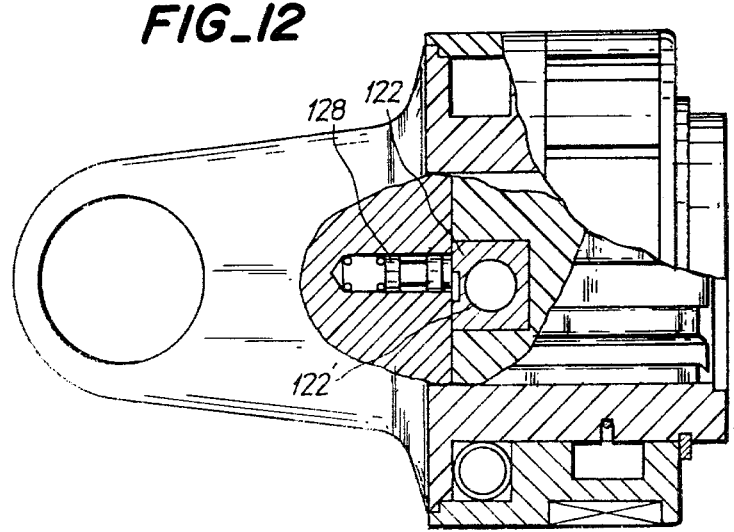
FIG_12

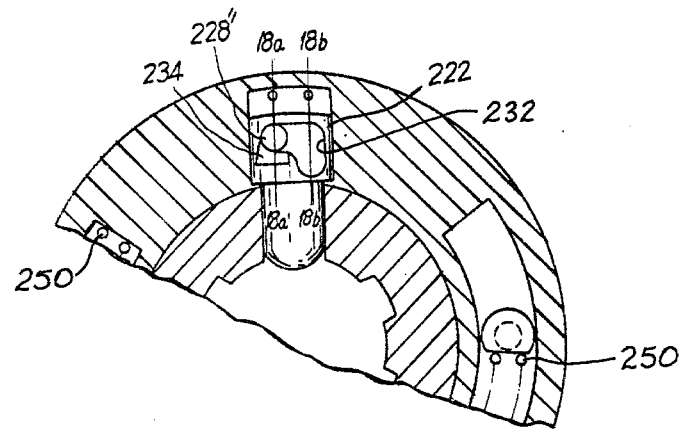
FIG_13a
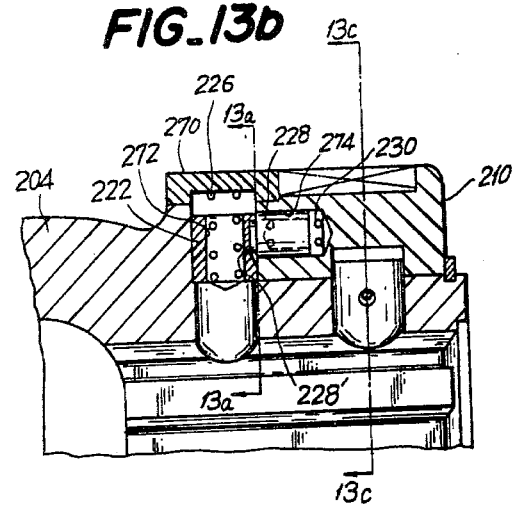
FIG_13b
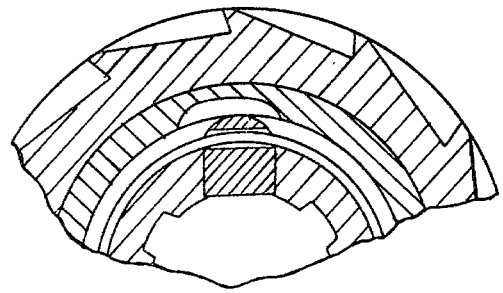
FIG_13c

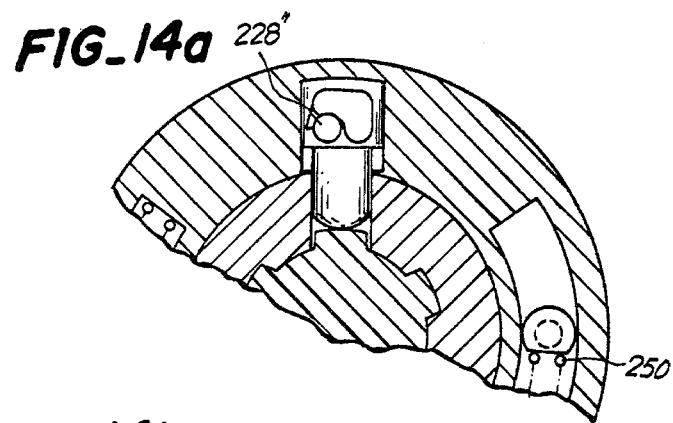
FIG_14a
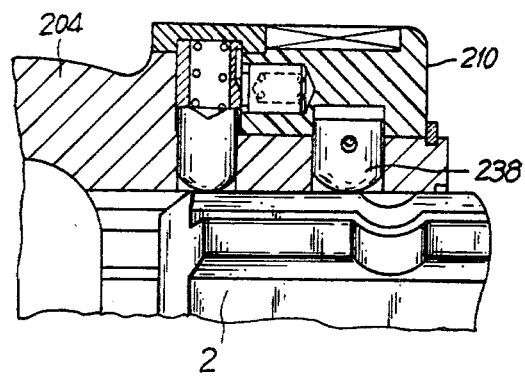
FIG_14b
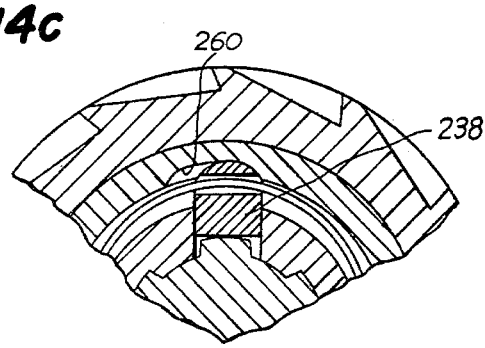
FIG_14c

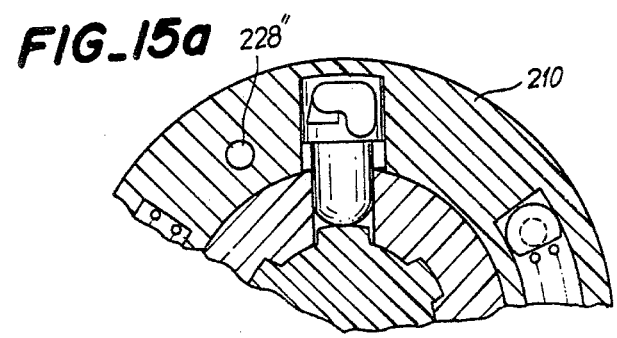
FIG_15a
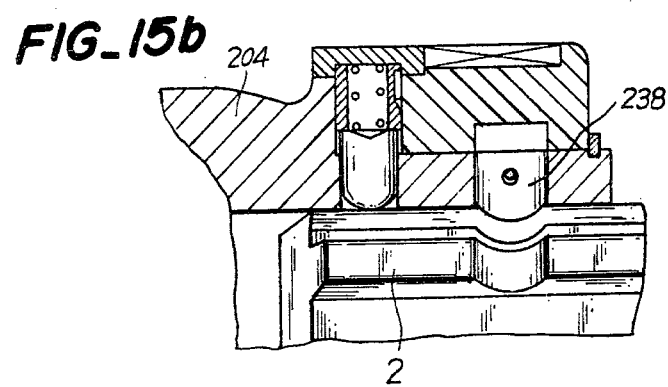
FIG_15b
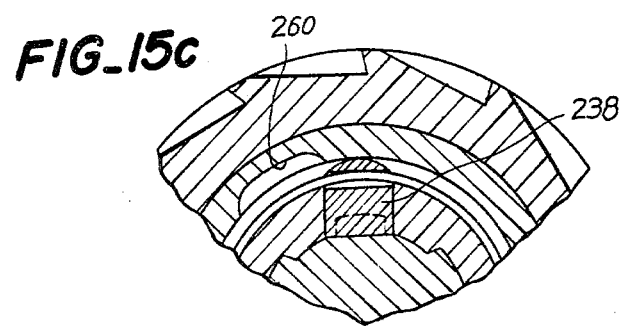
FIG_15c

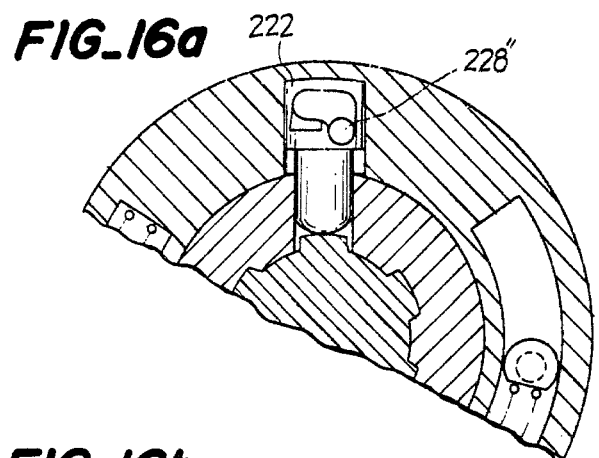
FIG_16a
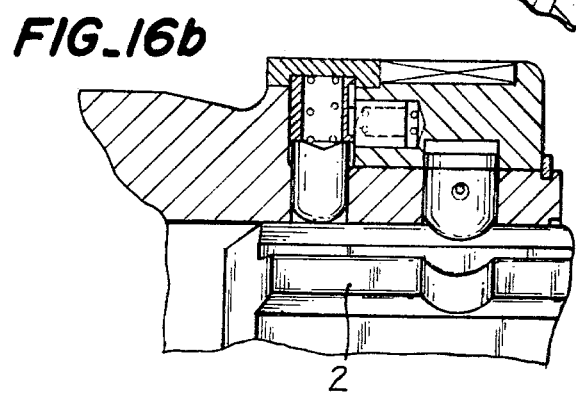
FIG_16b
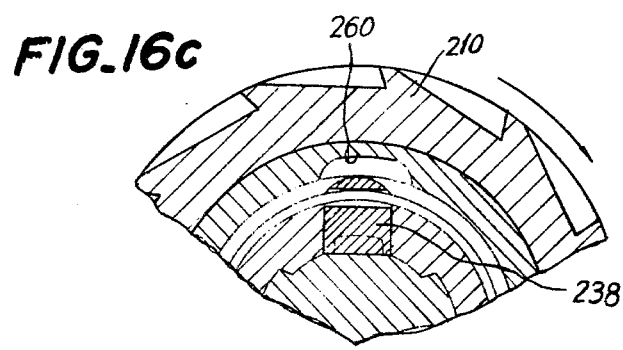
FIG_16c

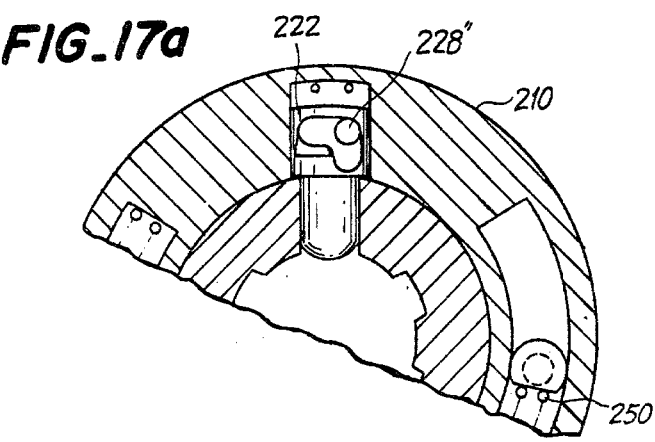
FIG_17a
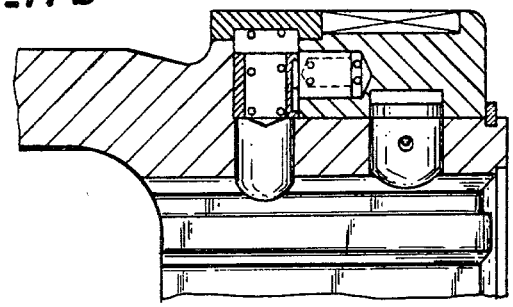
FIG_17b
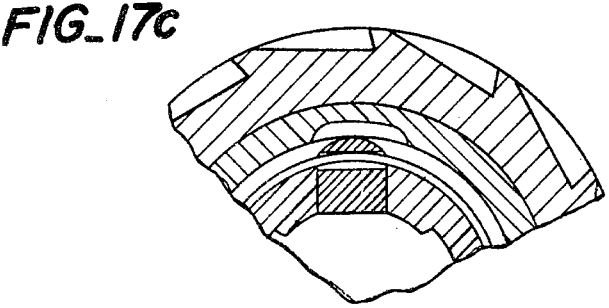
FIG_17c

 FIG_18a
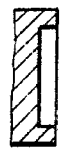 FIG_18b
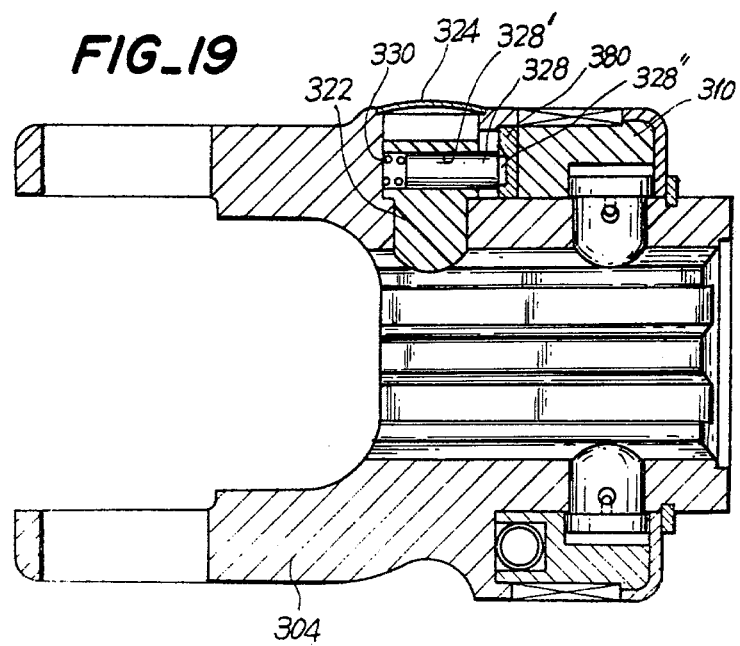 FIG_19

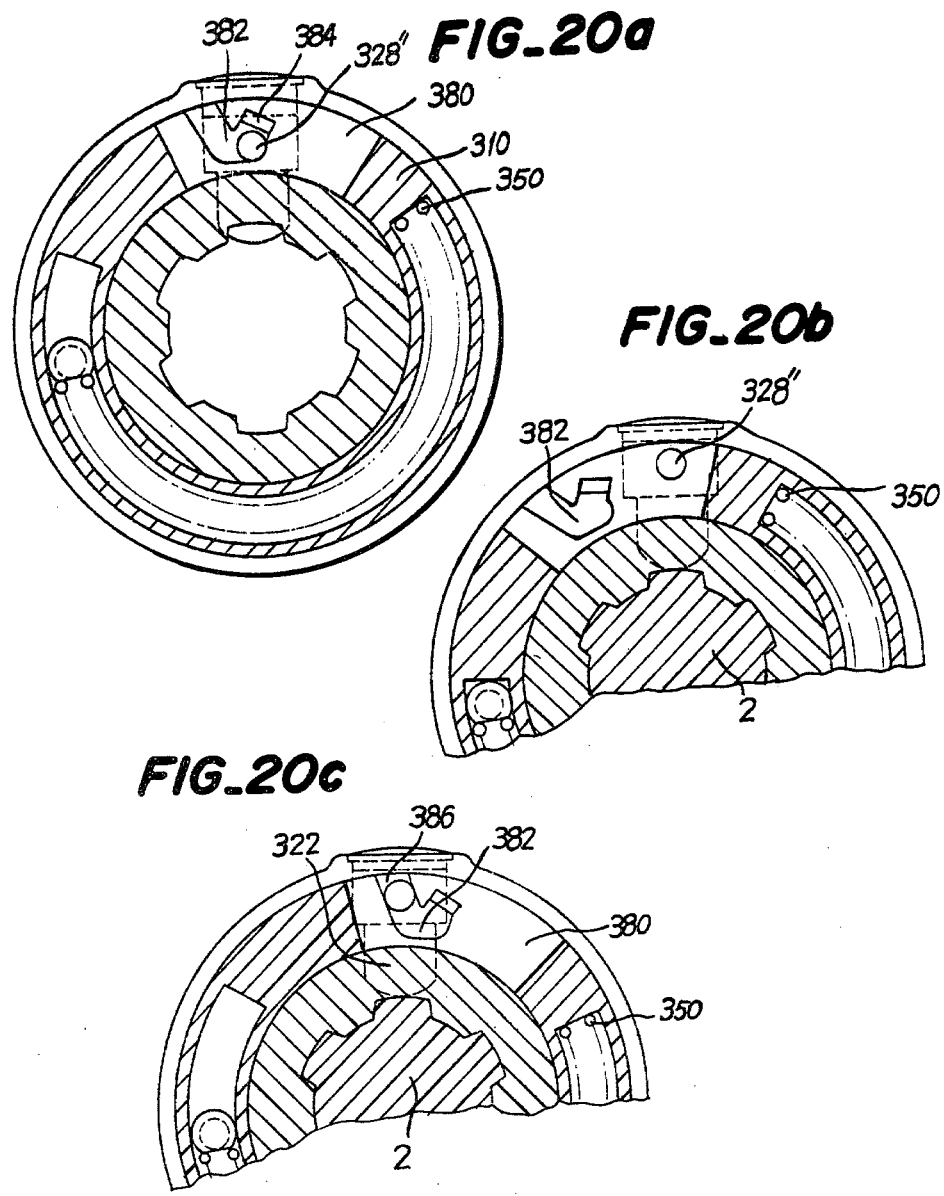

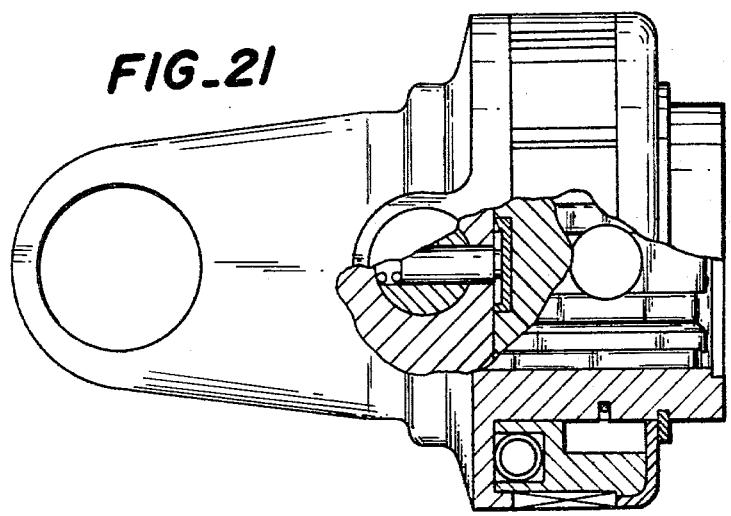
FIG_21
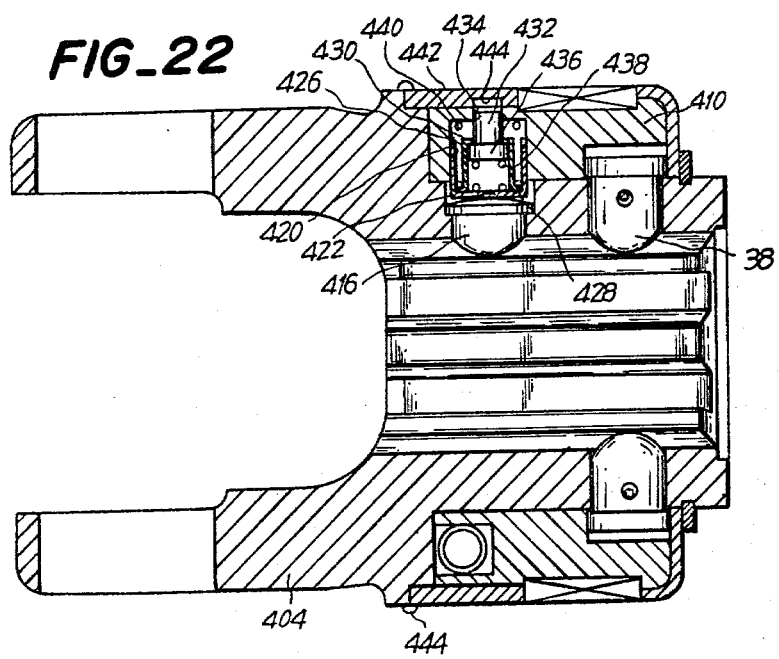
FIG_22

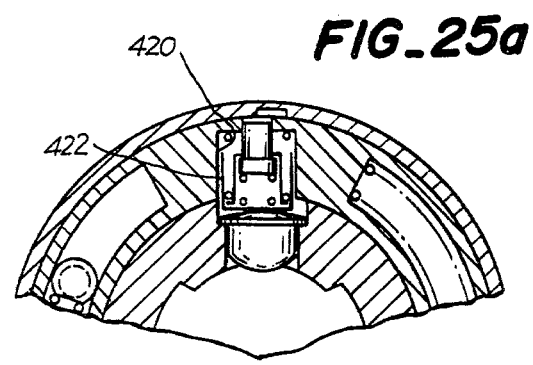
FIG_25a
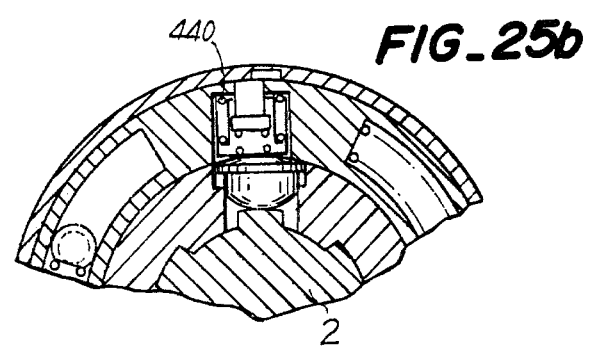
FIG_25b
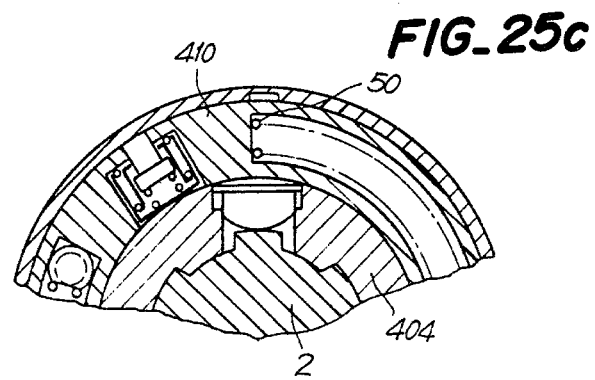
FIG_25c

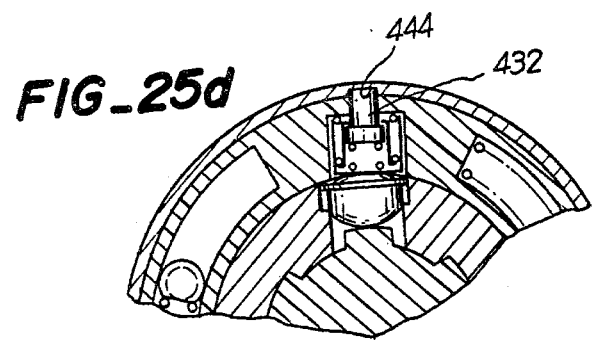
FIG_25d
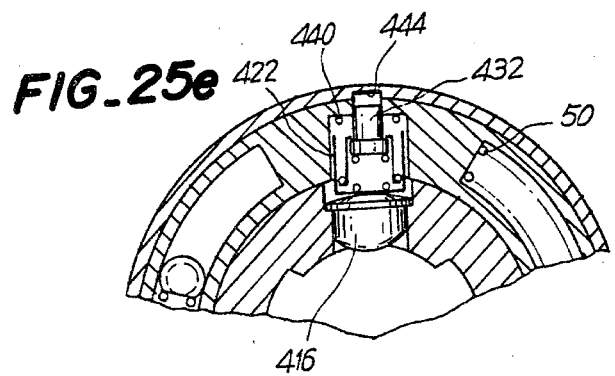
FIG_25e
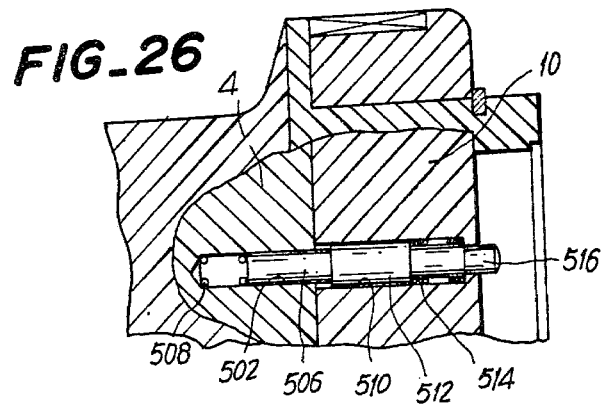
FIG_26

COUPLING DEVICE

BACKGROUND OF THE INVENTION

1. Field of the Invention

The present invention relates to a coupling device particularly suitable for connecting shafts for rotative power transmission and, more particularly, to a coupling device for all kinds of mechanical connections not exclusively for power transmission, capable of connecting a male member and a female member without any particular operation and disconnecting these members by a simple operation with ease if desired.

2. Description of the Prior Art

Connections for shafts have been used for various kinds of machines. Such connections are often located in limited spaces in the machines and are generally difficult and dangerous in operation. Particularly covers for protecting the connections from dusty atmosphere make more difficult the operation of the connections. It is clearly evident that a coupling device is advantageous in all kinds of machines, which is rapid and easy in connecting and disconnecting operations to improve the maneuverability of the machines.

SUMMARY OF THE INVENTION

It is an object of the present invention to provide a coupling device capable of connecting two members by a mere insertion of one member into the other member and disconnecting the two members by a slight rotation of a member provided on the other member.

It is another object of the present invention to provide a coupling device in simple in construction, easy and positive in operation and economical of manufacture.

In order to achieve these objects, the coupling device according to the invention including a male member having a tip tapered portion and a lock groove and a female member for receiving said male member comprises a lock pin resiliently urged toward said male member by means of spring means such that when said male member is inserted into said female member said lock pin is once forced away from said male member by a camming action of the tip tapered portion of the male member and extends into said lock groove when said lock pin becomes in opposition to said lock groove by a further insertion of the male member into said female member; an outer race rotatively resiliently urged in one direction relative to said female member by outer race spring means and formed with a recess for receiving a part of said lock pin to permit it to remove from said lock groove of said male member, said outer race being rotated by said outer race spring means when said lock pin extends into said lock groove of said male member to locate said recess of the outer race in a position remote from said lock pin to lock it relative to said male member; a slide pin for locking said outer race relative to said female member when said male member is not in said female member and releasing said outer race relative to said female member by an movement of said slide pin when said male member is inserted in said female member; and an outer race lock pin urged by outer race lock pin spring means to lock said outer race relative to said female member when the outer race is rotated to bring said recess in aligned with said lock pin for removing said male member from said female member.

In order that the invention may be more clearly understood, preferred embodiments will now be described, by way of example, with reference to the accompanying drawings.

BRIEF DESCRIPTION OF THE DRAWINGS

FIGS. 4–8 with the letter designations thereof illustrate the steps of connecting and disconnecting of the coupling device according to the invention in FIG. 1, respectively;

FIG. 9 is a sectional view of another embodiment of the coupling device according to the invention;

FIG. 10 is a sectional view taken along the line X—X in FIG. 9;

FIG. 11 is a sectional view taken along the line XI—XI in FIG. 9;

FIG. 12 is a plan view of the yoke in FIG. 9;

FIGS. 13–17 with the letter designations thereof illustrate the steps of connecting and disconnecting of further embodiment of the coupling device according to the invention, respectively;

FIGS. 18a and 18b are partial sectional views of a slide pin for showing the configuration of the recess formed in the slide pin for the lock pin used in the coupling device shown in FIGS. 13–17;

FIG. 19 is a sectional view of another embodiment of the coupling device according to the invention;

FIGS. 20a, 20b and 20c illustrate the steps of connecting and disconnecting of the coupling device shown in FIG. 19, respectively;

FIG. 21 is a plan view, partially in section, of the coupling device shown in FIG. 19;

FIG. 22 is a sectional view of further embodiment of the coupling device according to the invention;

FIGS. 25a–25e illustrate the steps of connecting and disconnecting the coupling device shown in FIGS. 22–24, respectively; and FIG. 26 is a partial sectional view of the safety device for preventing a rotation of the outer race of the coupling device when suddenly stop.

DETAILED DESCRIPTION OF THE PREFERRED EMBODIMENT

Figure 1:
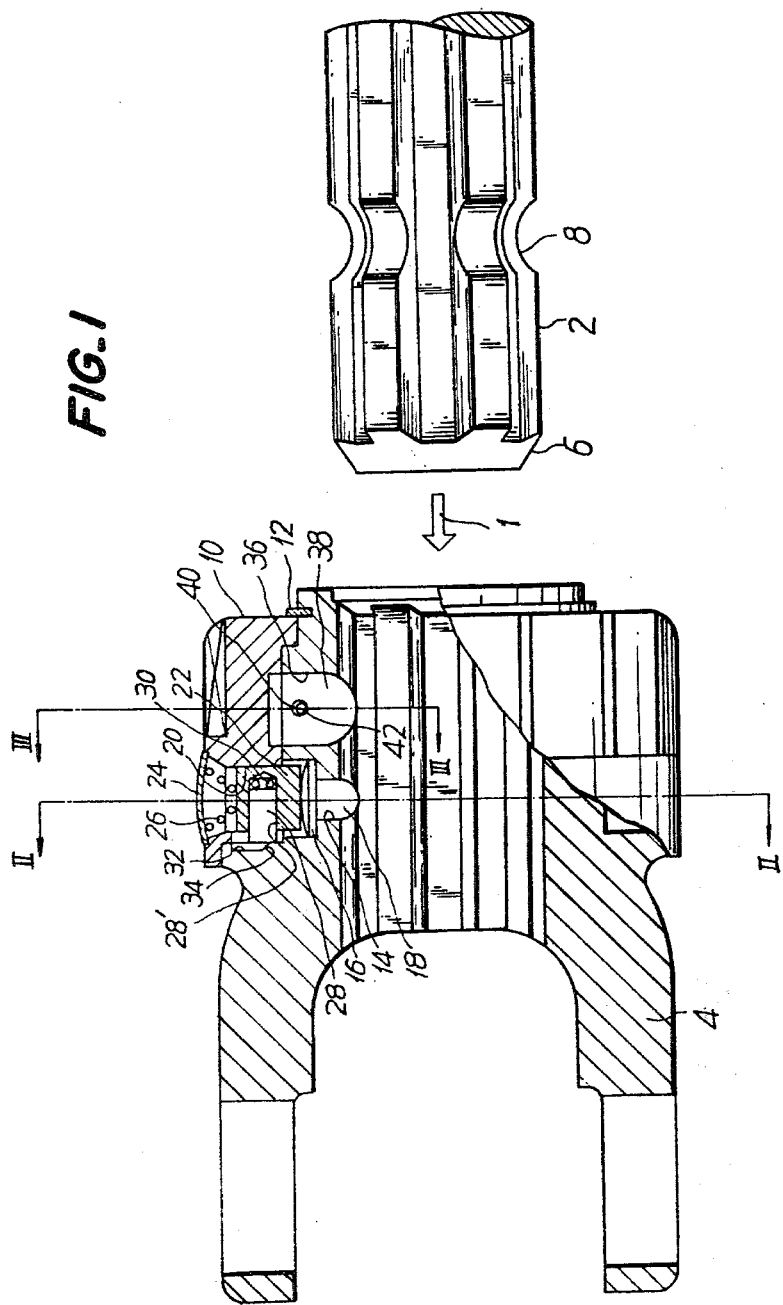
FIG. 1 is a partial sectional view of one embodiment of the coupling device according to the invention applied to a spline shaft and a yoke.
Figure 2:
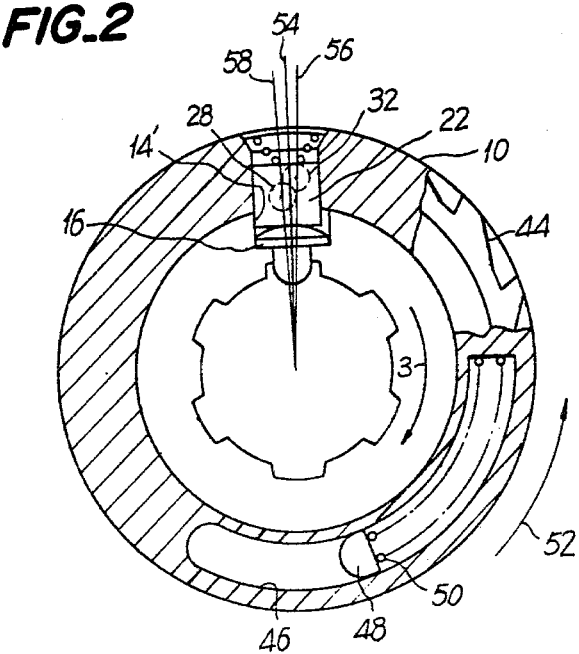
FIG. 2 is a partial sectional view taken along the line II—II in FIG. 1.

Referring to FIGS. 1 and 2 of the drawings, illustrating the first embodiment of the coupling device according to the present invention, the device is applicable to a coupling for connecting a spline shaft 2 to a yoke 4 to be driven in the direction of an arrow 1. It should of course be understood that the present invention may also be applicable to connections of shafts other than splined shafts such as those including keys and key ways and other torque transmission means.

The spline shaft 2 is formed at its end with a tip tapered portion 6 and at a location away therefrom with a circular lock groove 8 for a lock pin. As shown in FIG. 1, an outer race 10 is closely fitted on the yoke 4 and held in position by means of a retaining or snap ring 12 for preventing the outer race 10 from coming off from the yoke 4. The outer race is preferably made of a plastic material.

The yoke 4 is formed with a stepped hole 14 to form a shoulder therein, upon which a push pin 16 rests such that a reduced diameter portion 18 of the push pin 16 in the from of a mushroom extends into a splined bore of the yoke and adapted to engage the spline shaft 2. The outer race 10 is formed with an aperture 20 in alignment with the stepped hole 14 for slidingly receiving a slide pin 22. A cover 24 is arranged at the outer end of the aperture 20, and a spiral spring 26 in the form of a frust-cone is located between the cover 24 and the slide pin 22 in the aperture 20 to cause the slide pin 20 to urge the push pin 16 inwardly with the aid of the compressive force of the spiral spring 26.

The slide pin 22 is formed with a blind hole 28' perpendicular to an axis of the slide pin 22 for a lock pin 28 slidable in the hole 28' and adapted to be urged outwardly by a compression spring 30 located at the bottom of the blind hole 28'. The term "blind hole" used herein means a hole having a bottom, which is not a through hole. The hole 28' in the slide pin 22 may be a through hole. As can be seen in FIGS. 1 and 2, a shallow recess 32 is formed in the yoke 4 at a location slightly shifted from a contact position of the lock pin 28 of the slide pin 22 with the yoke 4. (The shallow recess 32 is shifted slightly to the upper right as viewed in FIG. 2.) The shallow recess 32 includes a taper surface 34 on the side near the center of the yoke 4 (FIG. 1). Functions of the recess 32 and the taper surface 34 will be explained latter.

Figure 3:
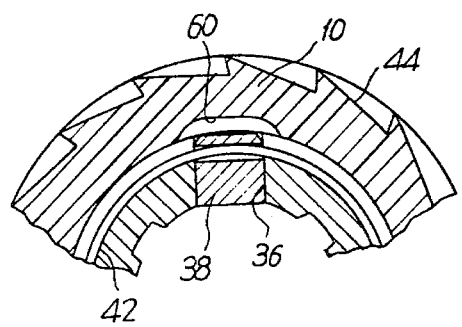
FIG. 3 is a partial sectional view taken along the line III—III in FIG. 1.

As shown in FIGS. 1 and 3, the yoke 4 is formed with a lock pin hole 36 for slidably receiving a lock pin 38. The inner end of the lock pin 38 is semicircular as viewed in FIG. 1, but is flat as viewed in a plane normal to that of FIG. 1, which engages in the circular groove 8 in the spline shaft 2 to lock it in the yoke 4 when they are connected. The lock pin 38 is formed at its outer end with a small aperture 40 through which an annular spring 42 passes to restrain resiliently the outward movement of the lock pin 38. Such an annular spring 42 additionally serves to prevent the lock pin 38 from rotating and falling off into the splined bore of the yoke 4. The annular spring is particularly advantageous in case of two diametrically opposite lock pins or three or more lock pins circumferentially equally spaced apart in the yoke. The outer race 10 is formed on its outer periphery with saw-toothed surface 44 to facilitate rotating the outer race 10 manually or by means of a lever. A knurled surface may be substituted for the saw-toothed surface when the outer race 10 is operated only by hand. If mechanical driving means is used for rotating the outer race 10, any suitable means on the outer race 10 mating with the driving means may be used. The outer race 10 is formed in its inner surface with a recess 60 (FIG. 3), which will be explained latter.

It is preferable to provide one push pin 16, one slide pin 22 and two lock pins 38 diametrically opposite to each other.

As can be seen from FIG. 2, the outer race 10 is formed in its surface in contact with the yoke 4 with an arcuate groove 46, within which slides a protrusion 48 formed in the yoke to limit the rotation of the outer race 10 relative to the yoke 4 by an abutment of the protrusion 48 with one end or left end of the arcuate groove 46 as viewed in FIG. 2. Furthermore, a compression spring 50 is arranged along the arcuate groove 46 between the protrusion 48 and the other end of the arcuate groove 46 to urge the outer race in a counterclockwise direction as viewed in FIG. 2 (the direction of an arrow 52).

In the urged condition of the outer race 10 in the direction of the arrow 52, the slide pin 22 is urged against the enlarged diameter portion 14' of the stepped hole 14 in the yoke 4 at the lower end of the slide pin 22 in contact with the push pin 16. In this embodiment, the diameter of the enlarged portion 14' of the stepped hole 14 was 2 mm larger than that of the slide pin 22. The shallow recess 32 was shifted 1 mm. toward the right and the center of the lock pin 38 was shifted 1 mm. toward the left as viewed in FIG. 2.

The operation of the coupling device shown in FIGS. 1-3 will be explained with reference to FIGS. 4-8. FIGS. 4a-4c illustrate the coupling device in the condition the same as that of FIGS. 1-3 capable of connecting the spline shaft by a mere insertion thereof into the yoke without requiring any particular operation. The push pin 16 is urged inwardly by the slide pin 22 with the aid of the compressive force of the spiral spring 26 so that the reduced diameter portion of the push pin 16 extends into the spline groove of the yoke. The lock pin 38 is also urged inwardly by the action of the annular spring 42 so that the inner end of the lock pin 38 extends into the spline groove of the yoke.

The outer race 10 is urged by an action of the spring 50 in the counterclockwise direction as viewed in FIG. 4a but does not rotate relative to the yoke 4 because of the lower end of the slide pin 22 within the stepped hole 14 in the yoke 4.

Starting from the condition in FIG. 4, the spline shaft 2 is inserted into the yoke 4 (FIG. 5). First the lock pin 38 is forced outwardly away from the spline shaft against the compressive force of the annular spring 42 by a camming action of the tapered portion 6 of the spline shaft 2, so that the spline shaft 2 can be inserted into the yoke 4 beyond the position of the lock pin 38. The push pin 16 is then forced outwardly against the compressive force of the spiral spring 26 by the camming action of the tapered portion 6 of the spline shaft 2 so that the spline shaft 2 can be further inserted into the yoke 4 (FIG. 5).

In the condition shown in FIG. 5, the outer end of the lock pin 38 extends in the recess 60 formed in the inside of the outer race 10. The lock pin 28 has been raised outwardly together with the slide pin 22 and in the proximity of the recess 32 of the yoke. In this condition, however, the lock pin 28 could not extend into the recess 32 in spite of the compressive force of the spring 30, because the lock pin 28 is not in alignment with the recess 32 as shown in FIG. 5a.

Figure 6A:
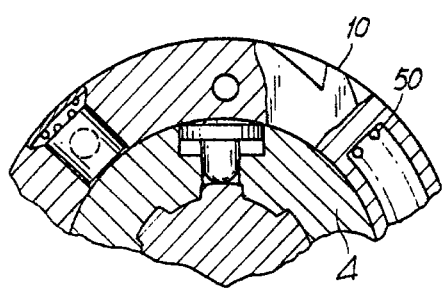
Figure 6B:
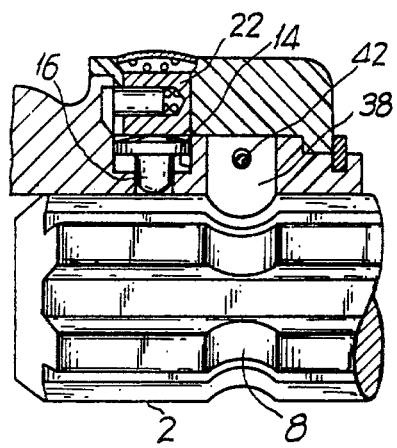
Figure 6C:
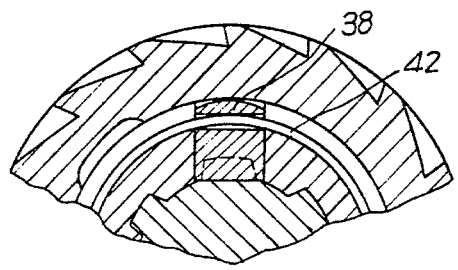

The spline shaft 2 is further inserted from the position shown in FIG. 5 into the splined bore of the yoke until the lock pin 38 becomes in registry with the lock groove 8 of the spline shaft 2 just when the inner end of the lock pin 38 extends into the lock groove 8 of the spline shaft 2 by the action of the annular spring 42 (FIG. 6). When the inner end of the lock pin 38 has extended in the lock groove 8 of the spline shaft 2, the outer end of the lock pin 38 has moved inwardly out of the recess 60 of the outer race 10. The slide pin 22 has been moved outwardly by the push pin 16 and out of the stepped hole 14 of the yoke, so that there is now no obstruction of the rotative movement of the outer race 10 caused by the spring 50 relative to the yoke. The outer race rotates, therefore, in the counterclockwise direction as viewed in FIG. 6a to the position shown in FIG. 6a. In this position, the recess 60 formed in the inside of the outer race assumes a position away from the lock pin 38, so that the lock pin 38 will never come off from the lock groove 8 of the spline shaft 2 with the result that the spline shaft is firmly connected and locked to the yoke.

Figure 7A:
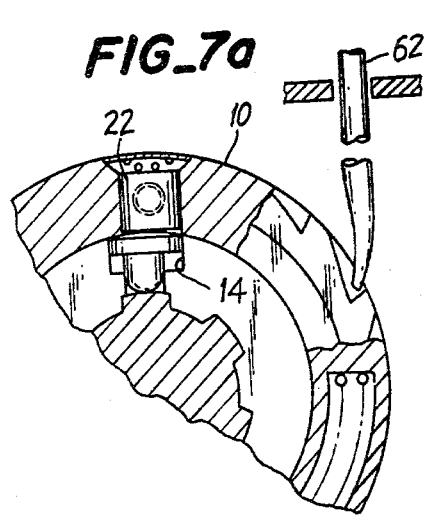
Figure 7B:
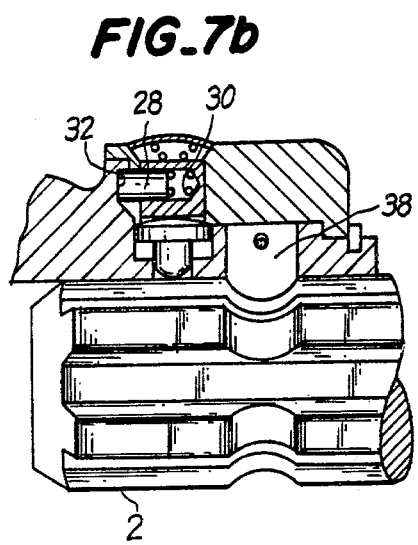
Figure 7C:
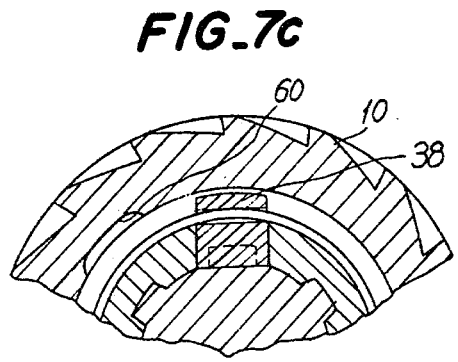

When it is required to disconnect the spline shaft from the yoke, the outer race 10 is manually rotated by a hand or a lever 62 in a clockwise direction as viewed in FIG. 7a to the position as shown in FIG. 7a wherein the outer race 10 assumes a position slightly beyond in the clockwise direction the position shown in FIG. 5a. In this position, the lock pin 28 extends into the recess 32 by the compressive force of the spring 30 so as to lock the outer race 10 relative to the yoke, and the recess 60 in the inside of the outer race 10 is in alignment with the lock pin 38 to permit the outward movement of the lock pin into the recess 60, so that the spline shaft 2 is ready to be removed from the yoke 4 (FIG. 7). In this condition, right side of the slide pin 22 is aligned with the right side of the enlarged diameter portion of the stepped hole 14 as viewed in FIG. 7a.

The spline shaft 4 can be removed from the yoke in this manner. Upon removal of the spline shaft, the push pin 16 extends into the spline groove of the yoke 4 and the lower end of the slide pin 22 extends into the enlarged diameter portion of the stepped hole 14. This is achieved by the fact that when the lock pin 28 of the slide pin 22 moves inwardly of the yoke together with the slide pin 22, the lock pin 28 moves simultaneously inwardly of the slide pin 22 with the aid of the taper surface 34 of the recess 32 of the yoke to release the lock of the outer race. At this moment the outer race 10 is slightly rotated together with the slide pin 20 by the action of the compression spring 50 from the position shown in FIG. 8a and returned to the position shown in FIG. 4a.

FIGS. 9-12 illustrate the second embodiment of the present invention which is similar to the first embodiment shown in FIGS. 1-3 is provided with members the same as the push pin 16 and slide pin 22 in the previous embodiment, with the exception that the lock pin of the slide pin is not provided in the slide pin but in the yoke and hence the recess for locking the lock pin is provided in the slide pin and the slide pin is quadrilateral in crossection. The feature of providing the lock pin out of the slide pin makes it easy to manufacture the coupling device and ensures a more aesthetical apperance and a positive operation of the coupling device. The quadrilateral crosssection of the slide pin prevents the rotation thereof about its axis.

Only the difference of the second embodiment of the invention from the first embodiment will be explained hereinafter since the construction and operation of the second embodiment may be clearly evident in comparison of FIGS. 9-12 with FIGS. 1-3 or 4-8. In the drawings, reference numerals added with 100 have been utilized to identify like parts in FIGS. 1-8.

As can be seen in FIG. 12, a slide pin 122 square in crosssection does not include a lock pin. In stead, there is provided with a blind hole 122' in the axial direction of the slide pin for a compression spring 126 for urging slide pin 122 and push pin 116 inwardly of the yoke 104. A compression spring may of course be provided out of the slide pin without forming the blind hole 122' as in FIGS. 1-8.

Referring to FIG. 9, a yoke 104 is formed with a blind hole 128' for slidably accommodating therein a lock pin 128 adapted to be urged against the slide pin 122 by a compression spring 130 received at the bottom of the blind hole 128'. The slide pin 122 is formed in its side surface facing to the lock pin 128 with a recess 132 having a taper surface 134 at its outer end. It can be understood that the taper surface 134 serves to push back into the blind hole 128' the lock pin 128 which extends in the recess 132 formed in the slide pin 122 when it is lowered down, which function is the same as that of the taper surface 34 in the embodiment shown in FIGS. 1-3. As can be seen in FIGS. 10 and 12, in an assembled condition prior to the insertion of the spline shaft center lines 158, 154 and 156 of the recess 132 of the slide pin 122, push pin 116 and lock pin 128 are slightly shifted as in the center lines 58, 54 and 56 in FIG. 2.

The operation of the coupling device shown in FIGS. 9-12 is substantially the same as that of the device shown in FIGS. 1-3, which will be simply explained. Starting from the condition shown in FIGS. 9-12, the spline shaft 2 is inserted into the splined bore of the yoke 104. Then the lock pin 138 is pushed outwardly against an annular spring 142 by the camming action of the tip tapered portion 6 of the spline shaft. As a recess 160 in the inside of the outer race 10 has been positioned in alignment with the lock pin 138, such an outward movement of the lock pin 138 is possible. A further insertion of the spline shaft into the spline bore of the yoke 104 causes the push pin 116 and slide pin 122 to move outwardly against the compression force of the spring 126 by means of the camming action of the tapered portion 6 of the spline shaft. As shown in FIG. 10, therefore, a reduced diameter portion 122" of the slide pin 122 has been moved out of a stepped hole 114 of the yoke 104. However, the outer end of the lock pin 138 has extended in the recess 160 in the inside of the outer race 110 thereby to prevent the rotation of the outer race 110 relative to the yoke 104. The spline shaft is inserted further inwardly into the spline bore of the yoke until the lock groove 8 of the spline shaft 2 is brought in alignment with the lock pin 138 which is immediately moved inwardly by the action of the annular spring 142, with the result that the outer end of the lock pin 138 is disengaged from the recess 160 of the outer race 110 to permit it to rotate in a direction of an arrow 152 by an action of a spring 150 (FIG. 10) into a position shown in phantom lines in FIGS. 10 and 11. In this position the spline shaft 2 is locked to the yoke 104 because of the lock pin 138 limited to move outwardly.

Then the outer race is rotated in a clockwise direction as viewed in FIG. 10 until the lock pin 128 moves to the position where it extends into the recess 132 of the slide pin 122. In this position, the spline shaft can be freely removed from the yoke 104, because the outer end of the lock pin 138 extends into the recess 160 of the outer race with the aid of the force for removing the spline shaft from the yoke. When the spline shaft has been removed from the yoke, the slide pin 122, push pin 116 and lock pins 128 and 138 return to the positions shown in FIG. 9.

This embodiment shown in FIGS. 9-12 is intended to improve the positive operation of the device by means of the square sectional slide pin for preventing it from rotating and has advantages in that the lock pin 128 for the slide pin is provided in the yoke to eliminate the difficulty in manufacture caused by the provision of a lock pin in a slide pin and to obtain a much more aesthetical appearance.

FIGS. 13-17 illustrate the further embodiment of the invention which is different from the above described embodiments in push pin and slide pin being integrally formed in a unitary element. A lock pin for a slide pin is not provided in the slide pin but in a yoke as that in the embodiment in FIGS. 9–12. In FIGS. 13–17, reference numerals added with 200 have been utilized to identify like parts in FIGS. 1–8.

A slide pin 222 in this embodiment is integrally formed with a push pin and has a circular cross-sectional inner end and a square crosssectional outer end. The outer end of the slide pin is formed with an axial blind hole 272. A compression spring 226 is arranged between a holding ring 270 and the bottom of the blind hole to urge the slide pin 222 inwardly. A compression spring may be arranged out of the slide pin without the blind hole. An outer race 210 is formed with a blind hole 274 for slidably accommodating a lock pin 228 adapted to be urged toward the slide pin by means of a compression spring 230 as shown in FIG. 13b. The lock pin 228 is formed at its end adjacent to the slide pin with a reduced diameter end 228'.

FIG. 13a is a sectional view taken along a line 13a—13a in FIG. 13b. The slide pin 222 is formed in its flat surface on the side of the lock pin 228 with a U-shaped groove 232, the position of the reduced diameter end 228' of the lock pin 228 being indicated at 228" which changes in various position in the operative stages shown in FIGS. 13–17. The length of the reduced diameter end 228' is preferably slightly shorter than the depth of the U-shaped groove 232 so that a shoulder of the lock pin 228 abuts against the slide pin around the U-shaped groove. Such a contact of the lock pin 228 with the slide pin 222 is advantageous in manufacture and operation.

The spline shaft 2 is then inserted into the yoke 204 to urge a lock pin 238 outwardly and then to move the slide pin 222 outwardly with its taper surface 234 facing to the reduced diameter end 228' of the lock pin 228 as the result of the outward movement of the slide pin 222. The lock pin 228 has been slightly moved to the right as viewed in FIG. 14b by a camming action of the taper surface 234. At the moment, the reduced diameter end 228' of the lock pin 228 is out of the U-shaped groove, so that the outer race 210 tends to rotate by an action of a compression spring 250. However, the outer race 210 could not rotate relative to the yoke 204 because an outer end of the lock pin 238 extends in a recess 260 in the inside of the outer race 210.

When the spline shaft 2 reaches a position shown in FIG. 15b, the lock pin 238 moves inwardly by an action of an annular spring so that the outer end of the lock pin 238 removes from the recess 260 permitting the rotation of the outer race 210. As the result, the lock pin 228 assumes a position 228" in FIG. 15a. In this condition, the lock pin 238 could not be moved and the spline shaft 2 is locked to the yoke 204.

In order to remove the spline shaft from the yoke, the outer race 210 is rotated in an direction of an arrow in FIG. 16c until the lock pin 228 assumes a position 228" in FIG. 16a. As can be seen in FIG. 16c, the lock pin 238 is spaced apart the recess 260 of the outer race 210, so that the spline shaft 2 can freely be removed from the yoke.

When the spline shaft 2 has been removed from the yoke, the slide pin 222 is moved inwardly by the action of the spring 226 so that the lock pin 228 assumes a position 228" in FIG. 17a. At this moment the outer race 210 is slightly rotated by the spring 250 to return the position shown in FIG. 13.

FIG. 18 illustrates partial crosssection of the U-shaped groove of the slide pin 222.

A further preferred embodiment of the invention is shown in FIGS. 19–21, which employs a slide pin and its lock pin different from those 222 and 228 of the embodiment shown in FIG. 13 and the lock pin is provided in the slide pin to shorten a length of an outer race. Moreover, an inner end of the slide pin is enlarged to prevent the slide pin from extending into the lock groove 8 of the spline shaft when it is inserted into a yoke 304 unintentionally beyond the determined final position.

The embodiment shown in FIGS. 19–21 is remarkably different from the above described embodiments in that the compression springs (26, 126 and 226) for the slide pins can be dispensed with. Referring to FIG. 13b, it will be seen that when the coupling device is suddenly stopped, inertia tends to cause the outer race 210 to continue to rotate relative to the yoke 204 and this rotation is in the same direction as that obtained by the lever 62 (FIG. 7a) for disconnecting the spline shaft from the yoke 204; so such inertial rotation is dangerous. To avoid this in the form of the invention shown in FIGS. 13a, 13b, and 13c, the compression spring 250 should be as stiff and strong as it can be, in order to overcome that inertial force. However, when the spring 250 is made stronger, the compression springs 230 and 226 must also be made stronger than before, and this means that greater force is required for inserting the spline shaft into the yoke against the compression force of the spring 226, making that operation more difficult than before. To solve this problem, the spring 226 is dispensed with in the embodiment shown in FIG. 19. In addition, a longer slide pin can be employed to prevent a jam of the slide pin and obtain a much more aesthetical appearance.

The slide pin 322 of the coupling device shown in FIGS. 19–21 is circular in section as shown in FIG. 21 with its reduced diameter inner end extending in a spline groove of the yoke 304.

The slide pin 322 is formed with an aperture 328' passing therethrough for slidably accommodating a lock pin 328 adapted to be urged by a compression spring 330. The aperture 328' may be a blind hole as the case may be. The lock pin 328 is formed at its end with a reduced diameter portion 328" adapted to abut against an arcuate plate 380 fixed to the outer race 310. A length of the reduced diameter portion 328" of the lock pin 328 in an axial direction is preferably slightly shorter than the depth of a groove as in the embodiment in FIGS. 13–18.

The arcuate plate 380 is formed with a groove which corresponds to the U-shaped groove 232 but is quite different in configuration from the U-shaped groove because of the absence of the spring for the slide pin. As shown in FIG. 20a, the groove formed in the arcuate plate 380 is a V-shaped groove and is angularly positioned relative to a radial direction. FIG. 20a is a sectional view of the device shown in FIG. 19 in a position where the spline shaft has not yet been inserted. In this position, the reduced diameter portion 328" of the lock pin 328 assumes a position shown in FIG. 20a to prevent a rotation of the outer race 310 caused by a spring 350. When the spline shaft 2 is inserted into the yoke 304, the reduced diameter 328" of the lock pin 328 is raised together with the slide pin so that the reduced diameter end 328" removes from the V-shaped groove 382 along a taper portion 384 at the upper right hand of the groove. The outer race is therefore released to move into a position shown in FIG. 20b by the action of the spring 350. In this position, the spline shaft 2 is locked by the lock pin 338 as in the above described embodiments.

In order to remove the spline shaft from the yoke, the outer race 310 is rotated against the compressive force of the spring 350 (FIG. 20c). As the result, the reduced diameter end 328" of the lock pin 328 moves to the left groove portion 386 of the V-shaped groove 382. In this position the spline shaft 2 is freely removed from the yoke. When the spline shaft 2 is removed, the spring 350 of the outer race 310 drives the arcuate plate 380 together with the outer race in a counterclockwise direction as shown in FIG. 20c, so that the reduced diameter end 328" of the lock pin is pushed downwardly by a camming action of the left groove portion 386 of the V-shaped groove 382 to force the slide pin 322 inwardly into a position shown in FIG. 20a. Such an inward movement of the slide pin 322 is achieved by a radially inward component of the compression force of the spring 350 with the aid of the camming action of the oblique groove 386 of the V-shaped groove 382 without using a spring for pushing down the slide pin 322.

A cover 324 may be dispensed with because of an absence of a spring for pushing down the slide pin 322 (FIG. 19).

Figure 23:
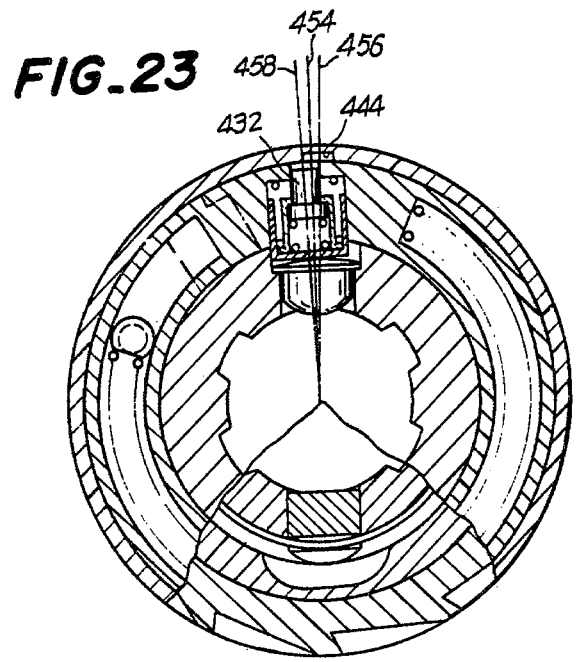
FIG. 23 is a crosssectional view of the coupling device shown in FIG. 22.
Figure 24:
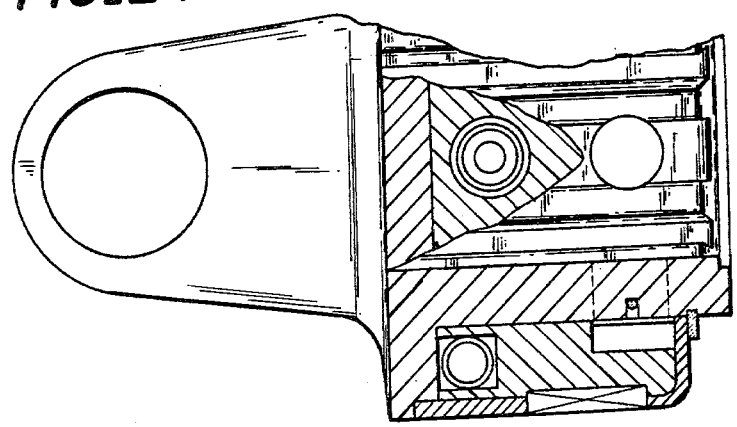
FIG. 24 is a plan view after partial removal of part.

FIGS. 22-24 illustrate a further embodiment of the invention, which includes a push pin 416 similar to those in FIGS. 1-12 and slide pin 422 quite different from those in the above described embodiments.

The slide pin 422 is in the form of a relatively thin cylinder which is at its bottom in contact with the push pin 416 and slidably movable in an aperture 420 formed in an outer race 410. Within the cylindrical slide pin 422 is provided an inner cylinder 426 comprising an inner end flange 428 extending radially outwardly and an outer end flange 430 extending radially inwardly. A lock pin 432 is slidable in an aperture 434 leading up from the upper end of the aperature 420 of the outer race in FIG. 22 and has an enlarged inner end 436 adapted to engage the inside of the outer end flange of the inner cylinder 426. A weak compression spring 438 is arranged between the inner end 436 of the lock pin 432 and the inner bottom of the cylindrical slide pin 422 to urge the lock pin 432 outwardly. Between the inner end flange 428 of the inner cylinder 426 and the bottom of the aperture 420 is provided a compression spring 440 stronger than the spring 438 to urge the cylindrical slide pin 422 against the push pin 416.

A yoke 404 is provided with an outer ring 442 fixed to the yoke by means of bolts. The outer ring 442 is formed with a recess 444 in opposition to the lock pin 432. As can be seen in FIG. 23, center lines 456 and 458 of the recess 444 and the lock pin 432 are slightly shifted relative to a center line 454 of the spline groove of the yoke in the same manner as in 56, 58 and 54 in FIG. 2.

The assembled coupling device of this embodiment is shown in FIG. 25a, which is ready for receiving the spline shaft 2. When the spline shaft 2 is inserted into the yoke, the tip tapered portion 6 of the spline shaft 2 causes the cylindrical slide pin 422 to push into the aperture 420 against the compression force of the spring 440 (FIG. 25b). The spline shaft 2 is further inserted into the yoke until the lock pin 38 extends into the lock groove 8 of the spline shaft, at which moment the outer race 410 is rotated by the spring 50 into a position shown in FIG. 25c to lock the spline shaft to the yoke in the same manner as in the above described embodiments.

In order to remove the spline shaft from the yoke, the outer race 410 is rotated until the lock pin 432 extends into the recess 444 (FIG. 25d). In this position, the lock pin 38 can be moved into the recess 60 of the outer race so that the spline shaft can be removed from the yoke. Upon removal of the spline shaft, the push pin 416 is returned to its original position by the compression spring 440 to cause the cylindrical slide pin 422 to return to its original position, so that the lock pin 432 is moved from the recess 444 to a position shown in FIG. 25e, immediately from which position the outer race 410 is returned into the position shown in FIG. 25a by the action of the spring 50.

Referring back to FIGS. 1-3, assuming that the coupling device is stopped suddenly during a high speed rotation in the direction of the arrow 3 in FIG. 2 the outer race 10 tends to move in the direction for disconnection of the coupling owing to the inertia force of the outer race 10 itself. However, the strong compression spring 50 serves as a safety device which always urges the outer race 10 in the opposite direction and the outer race preferably made of a plastic material is generally light weight with small inertia force, so that there would not be any risk of disconnection of the coupling device.

However, a safety device may be provided for more securely preventing the rotation of the outer race in a direction of the disconnection due to the inertia force upon a sudden stoppage of the coupling device. FIG. 26 illustrates one example of a principle of the safety device. The yoke 4 is formed with a blind hole 502 for slidably accommodating a suitable length pin 506 adapted to be urged outwardly by means of a spring 508 at the bottom of the blind hole 502. When the coupling device according to the invention is in the position shown in FIGS. 4 and 5 where the spline shaft has not yet been locked in the yoke, the outer end of the pin 506 is completely depressed in the blind hole 502 and a surface of the outer race in contact with the yoke 4 prevents the pin 506 from extending out of the blind hole 502.

The outer race 10 is formed with a stepped through aperture 510 for slidably receiving a stepped pin 512 having a suitable length adapted to be urged toward the pin 506 by means of a compression spring 514. The stepped through aperture 510 and stepped pin 512 are so located in the outer race that the stepped pin 512 of the outer race 10 is aligned with the pin 506 of the yoke 4 when the coupling device assumes the position in FIG. 6 where the outer race 10 has been in the locking position for locking the lock pin 38 in the lock groove 8 of the spline shaft as the result of the rotation of the outer race 10 by the action of the spring 50. In the position shown in FIG. 26, the stepped pin 512 is urged to the right because of the spring 508 stronger than the spring 514, so that a reduced diameter end 516 of the stepped pin 512 extends out of the outer race. In this position, the pin 506 also extends from the yoke 4 in the outer race 10 to prevent the rotation of the outer race due to the inertia force. If it is desired to disconnect the coupling device, the reduced diameter end 516 of the stepped pin 512 is pushed down into the outer race by a finger of an operator to enable the outer race to be rotated. The reduced diameter end 516 of the stepped pin 512 may be painted red to facilitate its identification. The stepped pin 512 may be magnetically pushed down by a remote control. The protrusion of the reduced diameter end 516 of the stepped pin 512 may be indicated by turning on a red lamp with the aid of a proximity switch.

As can be seen from the above description, the coupling device according to the invention is capable of connecting and disconnecting two mechanical parts in a very simple manner with a high reliability.

While I have shown and described the preferred embodiments of the invention, it is to be understood that the invention is not limited thereto but may be otherwise variously embodied within the scope of the following claims.

What is claimed is:

1. A coupling device including a male member having a tapered tip portion and a lock groove and a female member for receiving said male member, comprising a lock pin resiliently urged toward said male member by means of spring means such that when said male member is inserted into said female member said lock pin is forced away from said male member by a camming action of the tapered tip portion of the male member and extends into said lock groove when said lock pin is placed in opposition to said lock groove by a further insertion of the male member into said female member; an outer race rotatively resiliently urged in one direction relative to said female member by outer race spring means and formed with a recess for receiving a part of said lock pin to enable its removal from said lock groove of said male member, said outer race being rotated by said outer race spring means when said lock pin extends into said lock groove of said male member to locate said recess of the outer race in a position remote from said lock pin to lock it relative to said male member; a slide pin for locking said outer race relative to said female member when said male member is not in said female member and releasing said outer race relative to said female member by a movement of said slide pin when said male member is inserted in said female member; and an outer race lock pin urged by outer race lock pin spring means to lock said outer race relative to said female member when the outer race is rotated to bring said recess in alignment with said lock pin for removing said male member from said female member.

2. A device as set forth in claim 1, wherein said spring means for said lock pin is an annular spring.

3. A device as set forth in claims 1 or 2, wherein adjacent to said slide pin there is provided a push pin which is urged by said male member to urge said slide pin.

4. A device as set forth in claim 3, wherein said slide pin is made cylindrical and which is provided with an aperture for slidably accommodating said outer race lock pin, and said female member is formed with a recess for receiving said outer race lock pin for locking said outer race.

5. A device as set forth in claim 3, wherein said slide pin is quadrilateral in section, said female member is formed with an aperture for slidably accommodating said outer race lock pin and said slide pin is formed with a recess for receiving said outer race lock pin for locking said outer race.

6. A device as set forth in claim 1, wherein said slide pin consists of one half of a circular cross-section on the side of the male member and the remaining half of a quadrilateral cross-section having an outer surface of said quadrilateral cross-sectional portion formed with said recess for receiving said outer race lock pin, and said female member is formed with an aperture for slidably accommodating said outer race lock pin.

7. A device as set forth in claim 1, wherein said slide pin is made cylindrical which is provided with an aperture for slidably accommodating said outer race lock pin and a groove for receiving said outer race lock pin is provided on the side of said outer race.

8. A device as set forth in claim 7, wherein said groove is a V-shaped groove and upon removal of said male member from the female member said slide pin is returned by means of a camming action of the V-shaped groove with the aid of said outer race spring means.

9. A device as set forth in claim 3, wherein said outer race lock pin is slidably movable in said slide pin and said outer race and a recess for receiving said outer race lock pin is formed on the side of said female member.

10. A device as set forth in claim 1, wherein said device further comprises a safety pin for locking said female member and said outer race when said outer race assumes a position for locking said lock pin for locking said male member to said female member and a pin extending outwardly and urged there by said safety pin for indicating that said pin is in the locking position.

* * * * *